United States Patent
Park et al.

(10) Patent No.: US 11,159,215 B2
(45) Date of Patent: Oct. 26, 2021

(54) METHOD FOR SIMULTANEOUS DESIGN OF HYBRID TRANSCEIVER IN OFDM-BASED WIDEBAND MULTI-ANTENNA SYSTEM

(71) Applicant: Korea Advanced Institute of Science and Technology, Daejeon (KR)

(72) Inventors: Hyuncheol Park, Daejeon (KR); Hyunwoo Nam, Daejeon (KR); Girim Kwon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/867,684

(22) Filed: May 6, 2020

(65) Prior Publication Data
US 2021/0119676 A1    Apr. 22, 2021

(30) Foreign Application Priority Data
Oct. 16, 2019    (KR) .................. 10-2019-0128311

(51) Int. Cl.
| H04B 7/02 | (2018.01) |
| H04B 7/06 | (2006.01) |
| H04W 16/28 | (2009.01) |
| H04B 7/0456 | (2017.01) |

(52) U.S. Cl.
CPC ......... *H04B 7/0617* (2013.01); *H04B 7/0456* (2013.01); *H04B 7/066* (2013.01); *H04W 16/28* (2013.01)

(58) Field of Classification Search
CPC .... H04B 7/0617; H04B 7/0456; H04B 7/066; H04W 16/28

USPC ........................................................ 375/267
See application file for complete search history.

(56) References Cited

U.S. PATENT DOCUMENTS

| 2016/0142922 A1 | 5/2016 | Chen et al. | |
| 2019/0109689 A1* | 4/2019 | Huang | H04B 17/318 |
| 2019/0115963 A1* | 4/2019 | Zhu | H04B 7/0626 |
| 2019/0140730 A1* | 5/2019 | Oteri | H04B 7/0417 |
| 2019/0253211 A1* | 8/2019 | Kakishima | H04B 7/0619 |
| 2019/0268917 A1* | 8/2019 | Zhang | H04L 5/0092 |

FOREIGN PATENT DOCUMENTS

| KR | 1020140133481 | 11/2014 |
| KR | 101505880000 | 4/2015 |
| KR | 1020180077983 | 7/2018 |

OTHER PUBLICATIONS

The Korean Patent Office, English language machine translation of Office Action Refusal, dated Aug. 4, 2020, Application No. 10-2019-0128311, filed Oct. 16, 2019.

* cited by examiner

*Primary Examiner* — Don N Vo
(74) *Attorney, Agent, or Firm* — Wood Herron & Evans LLP

(57) ABSTRACT

A method for simultaneous design of a hybrid transceiver in an OFDM-based wideband multi-antenna system is provided. The method comprises: designing transmission/reception analog beamforming commonly used for each subcarrier by using product information of subcarrier channel information; and designing baseband beamforming for an effective channel of each subcarrier.

18 Claims, 4 Drawing Sheets

METHOD FOR SIMULTANEOUS DESIGN OF HYBRID TRANSCEIVER IN OFDM-BASED WIDEBAND MULTI-ANTENNA SYSTEM

CROSS REFERENCE TO RELATED APPLICATION

This application is based on and claims priority under 35 U.S.C. 119 to Korean Patent Application No. 10-2020-0128311, filed on Oct. 16, 2019, in the Korean Intellectual Property Office, the disclosures of which is herein incorporated by reference in their entireties.

BACKGROUND OF THE INVENTION

Field of the Invention

The following embodiments relate to a method for simultaneous design of a hybrid transceiver in an OFDM-based wideband multi-antenna system.

Related Art

Beamforming (or precoding) is a technology that focuses a transmitted signal in a particular direction by using multiple antennas. In particular, tremendously high frequency channels of sub-THz in the 0.1~1 THz range, which are taken into account in beyond 5G mobile communication systems, can easily have a wide bandwidth and use hundreds or thousands of antennas because of their very short wavelength, thereby allowing for narrow beamwidth and, in turn, overcoming high path attenuation.

To apply the existing digital multiple-input and multiple-output (MIMO) technology using multiple antennas, as many radio frequency (RF) chains as the number of antennas are required, but the use of a large number of antennas immensely increases hardware complexity and power consumption, making it impossible to implement the systems. To address this, digital-analog hybrid beamforming architecture is used which uses much fewer RF chains than the number of antennas. Here, an analog beamforming block consists only of RF phase shifters which are only capable of controlling the phase of a signal to reduce circuit complexity.

In a tremendously high frequency channel between transmitter and receiver in a wideband multi-antenna system using hundreds or thousands of antennas, spatial sparsity occurs due to physical characteristics such as path attenuation. With spatial sparsity, analog beamforming is done in a direction in which physical channels are formed, thereby achieving beamforming gain between transmitter and receiver.

When using an orthogonal frequency division modulation (OFDM) system to eliminate intersymbol interference (ISI) between wideband channels, hybrid beamforming can be designed, where one analog beamforming block is designed well in a beam direction and baseband beamforming is done on all subcarrier channels taking the fast Fourier transform/inverse fast Fourier transform of the analog beamforming block, as many times as the number of subcarrier channels. In order to maximize the spectral efficiency of hybrid beamforming, analog beams for the transmitter and receiver need to be matched by using every subcarrier's channel information. To this end, analog beamforming needs to be done simultaneously on the transmitting and receiving ends.

Designing analog beamforming with error from the actual channel beam direction due to its limited beam area or designing analog beamforming using a mean value of subcarrier channel information is not the best in terms of data rate when all subcarrier channels are taken into account. It is necessary to apply every subcarrier channel's information in order to improve the data rate of OFDM-based hybrid beamforming systems.

U.S. Laid-Open Patent No. US20160142922 relates to such a transceiver architecture for multiple antenna systems, which discloses a technique of designing transmission and reception beamformers separately by using feedback information in an OFDM channel environment.

PRIOR ART DOCUMENTS

Patent Document

U.S. Laid-Open Patent No. US20160142922

SUMMARY OF THE INVENTION

Exemplary embodiments describe a method for simultaneous design of a hybrid transceiver in an OFDM-based wideband multi-antenna system, and more particularly to a two-stage beamforming technique in a wideband hybrid beamforming system using as many RF chains as the number of antennas or fewer than that number.

Exemplary embodiments provide a method for simultaneous design of a hybrid transceiver in an OFDM-based wideband multi-antenna system that can improve spectral efficiency by designing analog beamforming simultaneously both at transmitting and receiving ends using product information of all subcarrier channels in the first stage and designing baseband beamforming in the second stage.

A method for simultaneous design of a hybrid transceiver in an OFDM-based wideband multi-antenna system according to an exemplary embodiment of the present invention may comprise: designing transmission/reception analog beamforming commonly used for each subcarrier by using product information of subcarrier channel information; and designing baseband beamforming for an effective channel of each subcarrier.

A transceiver may be simultaneously designed as a hybrid structure by reflecting information of all of the subcarrier channels through two stages, in order to reduce performance degradation in spectral efficiency caused when beamforming is designed separately for a transmitter and a receiver.

In the designing of analog beamforming, a transmission/reception analog beamformer may be designed which finds beam sets of the transmitter and receiver from a beam dictionary so as to be commonly used by the subcarrier channels, the beam sets being correlated with the product of the subcarrier channel information at a preset level or higher.

In the designing of analog beamforming, the highly correlated beams may be sequentially found using the beam dictionary, in order to maximize the achievable sum rate of the transmission/reception analog beamformer commonly used for each subcarrier.

In the designing of analog beamforming, the transmission/reception analog beamformer may be designed in such a way that approximation is done by an achievable sum rate formula to configure the transmission/reception analog beamformer alone, as if by assuming an ideal baseband beamformer and then eliminating the baseband beamformer.

The designing of analog beamforming may comprise: finding the most highly correlated beam set among transmission/reception analog beams using the beam dictionary; and finding sequentially the most highly correlated beam set in a beam area orthogonal to the most highly correlated beam set found from the beam dictionary, wherein the transmission/reception analog beamformer is simultaneously designed since the highly correlated beams are sequentially found.

The designing of analog beamforming may further comprise simultaneously designing the transmission/reception analog beamformer finally by designing an RF beamforming matrix of the transmitter and an RF beamforming matrix of the receiver, respectively.

In the finding of the most highly correlated beam set using the beam dictionary, once the beam set most highly correlated with the product of the subcarrier channel information is found, the beam set may fill the block of the transmission/reception analog beamformer.

In the designing of baseband beamforming, a baseband transceiver beamformer may be designed in such a way as to maximize spectral efficiency by singular value decomposition of the effective channel information of each subcarrier.

In the designing of baseband beamforming, a baseband beamforming matrix corresponding to a kth subcarrier channel of the transmitter and a baseband beamforming matrix corresponding to the kth subcarrier channel of the receiver may be designed by singular value decomposition of the effective channel information of each subcarrier.

An OFDM-based wideband multi-antenna system for simultaneous design of a hybrid transceiver according to another exemplary embodiment may comprise: a transmission/reception analog beamformer that designs transmission/reception analog beamforming commonly used for each subcarrier by using product information of subcarrier channel information; and a baseband beamformer that designs baseband beamforming for an effective channel of each subcarrier.

A transceiver may be simultaneously designed as a hybrid structure by reflecting information of all of the subcarrier channels through two stages, in order to reduce performance degradation in spectral efficiency caused when beamforming is designed separately for a transmitter and a receiver.

The transmission/reception analog beamformer may be a transmission/reception analog beamformer which finds beam sets of the transmitter and receiver from a beam dictionary so as to be commonly used by the subcarrier channels, the beam sets being correlated with the product of the subcarrier channel information at a preset level or higher.

The transmission/reception analog beamformer may sequentially find the highly correlated beams using the beam dictionary, in order to maximize the achievable sum rate of the transmission/reception analog beamformer commonly used for each subcarrier.

The transmission/reception analog beamformer may be designed in such a way that approximation is done by an achievable sum rate formula to configure the transmission/reception analog beamformer alone, as if by assuming an ideal baseband beamformer and then eliminating the baseband beamformer.

The transmission/reception analog beamformer may simultaneously design transmission/reception analog beamforming by finding the most highly correlated beam set among transmission/reception analog beams using the beam dictionary and finding sequentially the most highly correlated beam set in a beam area orthogonal to the most highly correlated beam set found from the beam dictionary.

The transmission/reception analog beamformer may simultaneously design the transmission/reception analog beamformer finally by designing an RF beamforming matrix of the transmitter and an RF beamforming matrix of the receiver, respectively.

Once the transmission/reception analog beamformer finds the beam set most highly correlated with the product of the subcarrier channel information, the beam set may fill the block of the transmission/reception analog beamformer.

The baseband beamformer may be a baseband transceiver beamformer which is designed in such a way as to maximize spectral efficiency by singular value decomposition of the effective channel information of each subcarrier.

The baseband beamformer may design a baseband beamforming matrix corresponding to a kth subcarrier channel of the transmitter and a baseband beamforming matrix corresponding to the kth subcarrier channel of the receiver, by singular value decomposition of the effective channel information of each subcarrier.

According to exemplary embodiments, there is provided a method for simultaneous design of a hybrid transceiver in an OFDM-based wideband multi-antenna system, that uses as many RF chains as the number of antennas or fewer than that number through two-stage beamforming design in a wideband hybrid beamforming system.

According to exemplary embodiments, there is provided a method for simultaneous design of a hybrid transceiver in an OFDM-based wideband multi-antenna system that can improve spectral efficiency by designing analog beamforming simultaneously both at transmitting and receiving ends using product information of all subcarrier channels in the first stage and designing baseband beamforming in the second stage.

DESCRIPTION OF EXEMPLARY EMBODIMENTS

Hereinafter, exemplary embodiments of the present invention will be described with reference to the accompanying drawings. However, the embodiments of the present invention may be modified in many different forms, and the scope of the present invention is not limited to the embodiments described below. Moreover, the exemplary embodiments are provided to more fully illustrate the invention to those having an average knowledge in the art. The shapes and sizes of the elements may be exaggerated for clarity in the drawings.

The following embodiments relate to a method for simultaneous design of a hybrid transceiver in an OFDM-based wideband multi-antenna system, and propose a two-stage beamforming method in a wideband hybrid beamforming system that uses as many RF chains as the number of antennas or fewer than that number. In the proposed method, spectral efficiency is improved by designing analog beamforming simultaneously at transmitting and receiving ends using product information of all subcarrier channels in the first stage and designing baseband beamforming in the second stage.

Wideband hybrid beamforming comprises one analog beamformer and a baseband beamformer for each of all subcarriers. To design one analog beamformer, in the conventional art, beamforming is designed on the basis of feedback information by dividing a beam area, or beamforming is designed by using a mean value of all of the subcarrier channels' information. As such, the characteristics of all the subcarrier channels are not reflected properly, and therefore optimal beamforming design cannot be achieved.

In this exemplary embodiment, commonly used analog beamforming is designed in such a way that the product of all subcarrier channels is used to reflect information of all of the subcarrier channels, thereby improving spectral efficiency. Here, the beam refers to an antenna pattern formed by multiplying a weight vector by an antenna array at transmitting and receiving ends.

First of all, the notations of a system model to be used below will be described.

$N_{TX}$ is the number of antennas at the transmitter, $N_{RX}$ is the number of antennas at the receiver, K is the number of subcarriers in OFDM, $N_{RF}^{TX}, N_{RF}^{RX}$ are the number RF chains at the transmitter and receiver, respectively, $0 \leq N_s \leq \min(N_{RF}^{RX}, N_{RF}^{TX})$ is the number of transmitted streams. Also, $P_t$ is the transmitted power of the transmitter, x[k] is the transmitted signal vector transmitted on a kth subcarrier, and $H_d$ is the time domain complex channel matrix at time d between the transmitter and receiver, which is given by $H_d \in \mathbb{C}^{N_{RX} \times N_{TX}}$. H[k] is the frequency domain complex channel matrix at the kth subcarrier between the transmitter and receiver, which is given by $H[k] \in \mathbb{C}^{N_{RX} \times N_{TX}}$. $F_{RF}$ is the RF beamforming matrix of the transmitter, which is given by $F_{RF} \in \mathbb{C}^{N_t \times N_{RF}^t}$. $F_{BB}[k]$ is a baseband (BB) beamforming matrix corresponding to the kth subcarrier channel of the transmitter, which is given by $F_{BB} \in \mathbb{C}^{N_{RF}^t \times N_s}$. $W_{RF}$ is the RF beamforming matrix of the receiver, which is given by $W_{RF} \in \mathbb{C}^{N_r \times N_{RF}^r}$, and $W_{BB}[k]$ is a baseband beamforming matrix corresponding to the kth subcarrier channel of the receiver, which is given by $W_{BB} \in \mathbb{C}^{N_{RF}^r \times N_s}$. Also, n is the noise vector of the receiver, $P_n$ is noise power, $\mathbb{E}[\bullet]$ is an expectation operator, $I_K$ is the K×K identity matrix, and $[\bullet]^H$ is the conjugate transpose.

Figure 1:
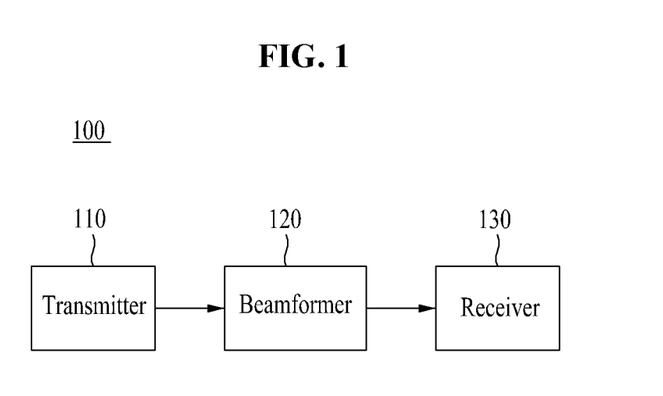
FIG. 1 is a view schematically showing an OFDM-based wideband multi-antenna system according to an exemplary embodiment of the present invention.

FIG. 1 is a view schematically showing an OFDM-based wideband multi-antenna system according to an exemplary embodiment.

Referring to FIG. 1, an OFDM-based wideband multi-antenna system for simultaneous design of a hybrid transceiver according to an exemplary embodiment is illustrated, and the wideband multi-antenna system 120 is configured between a transmitter 110 and a receiver 130. Such a wideband multi-antenna system 120 may comprise a beamformer. The beamformer may be a beamformer that performs two-stage beamforming. More specifically, the wideband multi-antenna system 120 may improve spectral efficiency by designing analog beamforming simultaneously both at transmitting and receiving ends using product information of all subcarrier channels in the first stage and designing baseband beamforming in the second stage.

In the exemplary embodiments, it is possible to reduce performance degradation in spectral efficiency caused when beamforming is designed separately for the transmitter 110 and receiver 130, since the transmitter and receiver are designed simultaneously in a hybrid structure by reflecting information of all subcarrier channels. Moreover, spectral efficiency may be improved through the design of baseband beamforming appropriate for an effective channel of each subcarrier, by simultaneously designing transmission and reception analog beamformers.

Figure 2:
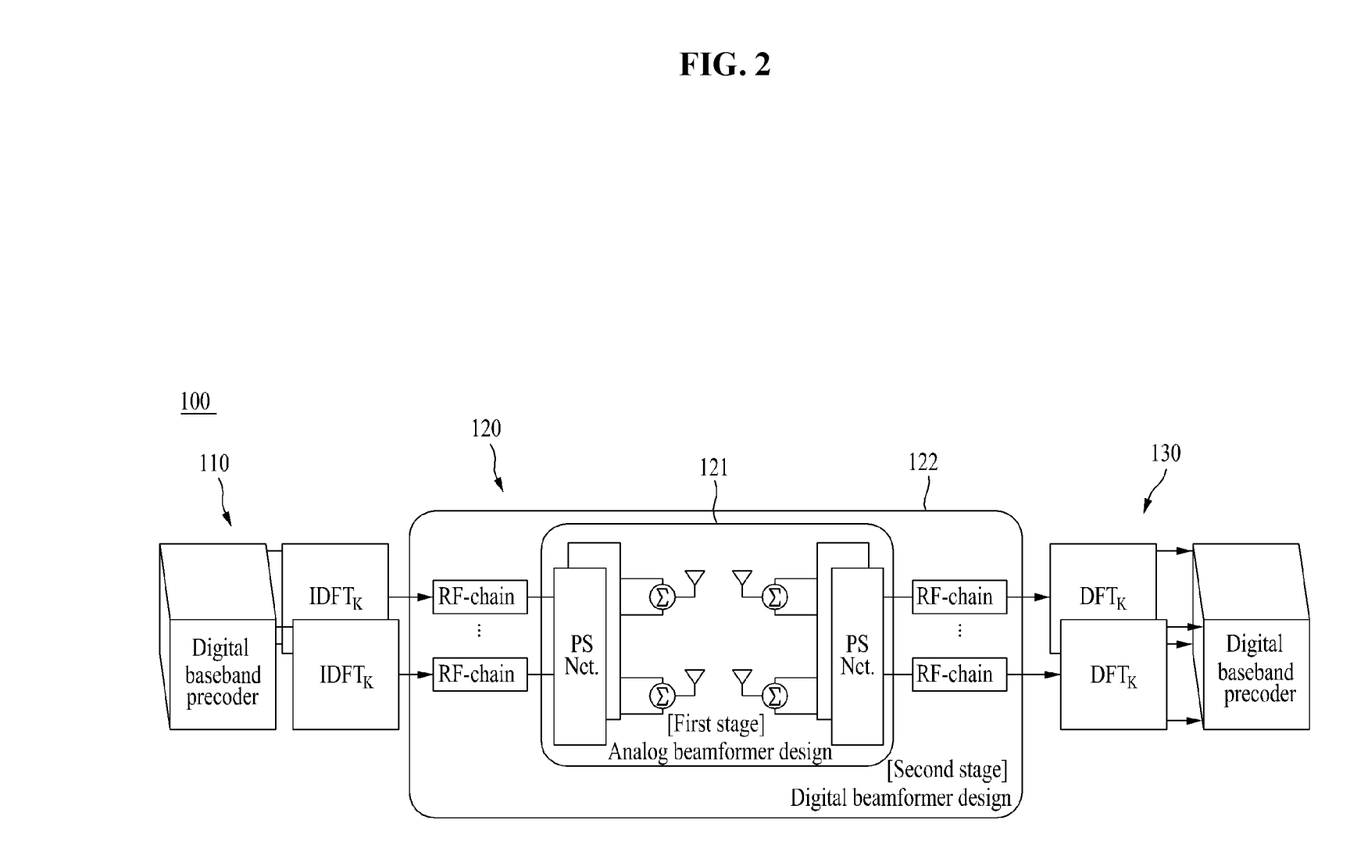
FIG. 2 is a view showing a structure of an OFDM-based wideband multi-antenna system for simultaneous design of a hybrid transceiver according to an exemplary embodiment.

FIG. 2 is a view showing a structure of an OFDM-based wideband multi-antenna system for simultaneous design of a hybrid transceiver according to an exemplary embodiment.

Referring to FIG. 2, the OFDM-based wideband multi-antenna system 120 for simultaneous design of a hybrid transceiver according to an exemplary embodiment is a P2P OFDM multiple input/output system comprising a two-stage hybrid beamformer, which will be referred to as an OFDM multiple input/output system or simply as a multi-antenna system. The OFDM-based wideband multi-antenna system 120 for simultaneous design of a hybrid transceiver according to an exemplary embodiment may comprise a transmission/reception analog beamformer 121 and a baseband beamformer 122.

The transmission/reception analog beamformer 121 may design transmission/reception analog beamforming commonly used for each subcarrier by using product information of subcarrier channel information. Here, the transmission/reception analog beamformer 121 may be a transmission/reception analog beamformer 121 that finds beam sets of the transmitter and receiver from a beam dictionary so as to be commonly used by the subcarrier channels, the beam sets being correlated with the product of the subcarrier channel information at a preset level or higher.

The transmission/reception analog beamformer 121 may sequentially find the highly correlated beams using the beam dictionary, in order to maximize the achievable sum rate of the transmission/reception analog beamformer commonly used for each subcarrier. For example, the transmission/reception analog beamformer 121 may be designed in such a way that approximation is done by an achievable sum rate formula to configure the transmission/reception analog beamformer alone, as if by assuming an ideal baseband beamformer and then eliminating the baseband beamformer.

The transmission/reception analog beamformer 121 may simultaneously design transmission/reception analog beamforming by finding the most highly correlated beam set among transmission/reception analog beams using the beam dictionary and then finding sequentially the most highly correlated beam set in a beam area orthogonal to the most highly correlated beam set found from the beam dictionary. Afterwards, the transmission/reception analog beamformer 121 may simultaneously design transmission/reception analog beamforming finally by designing an RF beamforming matrix of the transmitter 110 and an RF beamforming matrix of the receiver 130, respectively.

And, the baseband beamformer 122 may design baseband beamforming for an effective channel of each subcarrier. Here, the baseband beamformer 122 may be a baseband transceiver beamformer which is designed to maximize spectral efficiency by singular value decomposition of effective channel information of each subcarrier.

More specifically, the baseband beamformer 122 may design a baseband beamforming matrix corresponding to a kth subcarrier channel of the transmitter 110 and a baseband beamforming matrix corresponding to the kth subcarrier channel of the receiver 130, by singular value decomposition of effective channel information of each subcarrier.

An operation process of the OFDM-based wideband multi-antenna system 120 for simultaneous design of a hybrid transceiver is as follows.

In the proposed method for simultaneous design of two-stage transmission/reception beamforming, the product of subcarrier transmitter/receiver channel information is used. Transmission/reception analog beamforming is designed with beamforming signals highly correlated with product information, and then baseband beamforming is designed for effective channel information of each subcarrier.

More specifically, in the first stage, a transceiver analog beamformer 121 is designed which finds beam sets highly correlated with the product of subcarrier transmitter/receiver channel information from a beam dictionary so as to be commonly used by the subcarrier channels. Here, the beam dictionary is a set of beam pattern candidates that can be configured depending on the azimuth angle and elevation angle at the transmitting and receiving ends.

Once a highly correlated beam set is found, it fills the block of the transmission/reception analog beamformer 121, and then the most highly correlated beam set is sequentially found in a beam area orthogonal to the above designed beams, thereby finally designing $F_{RF}$ and $W_{RF}$.

In the second stage, after the transmission/reception analog beamforming, $F_{BB}[k]$ and $W_{BB}[k]$ of the baseband beamformer 122 are designed by singular value decomposition of the effective channel information $W_{RF}^H H[k] F_{RF}$ corresponding to each subcarrier.

Figure 3:
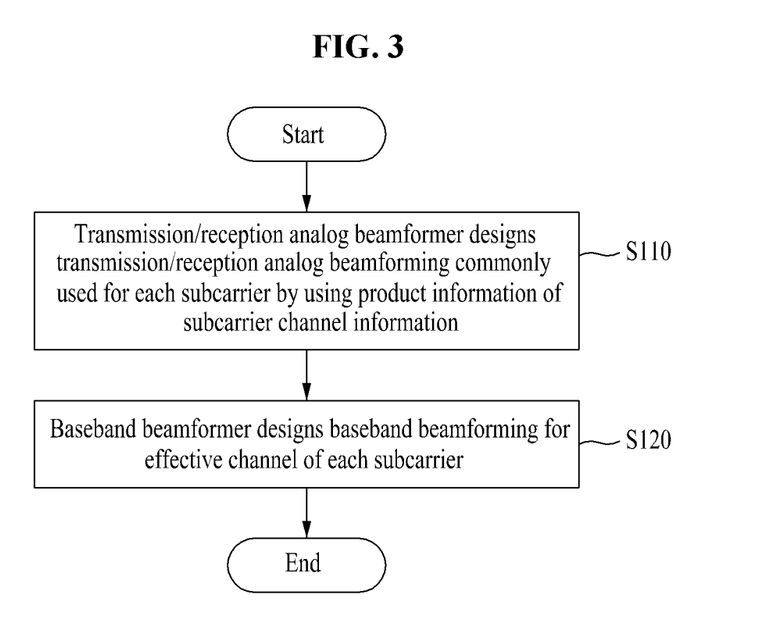
FIG. 3 is a flowchart showing a method for simultaneous design of a hybrid transceiver in an OFDM-based wideband multi-antenna system according to an exemplary embodiment of the present invention.
Figure 4:
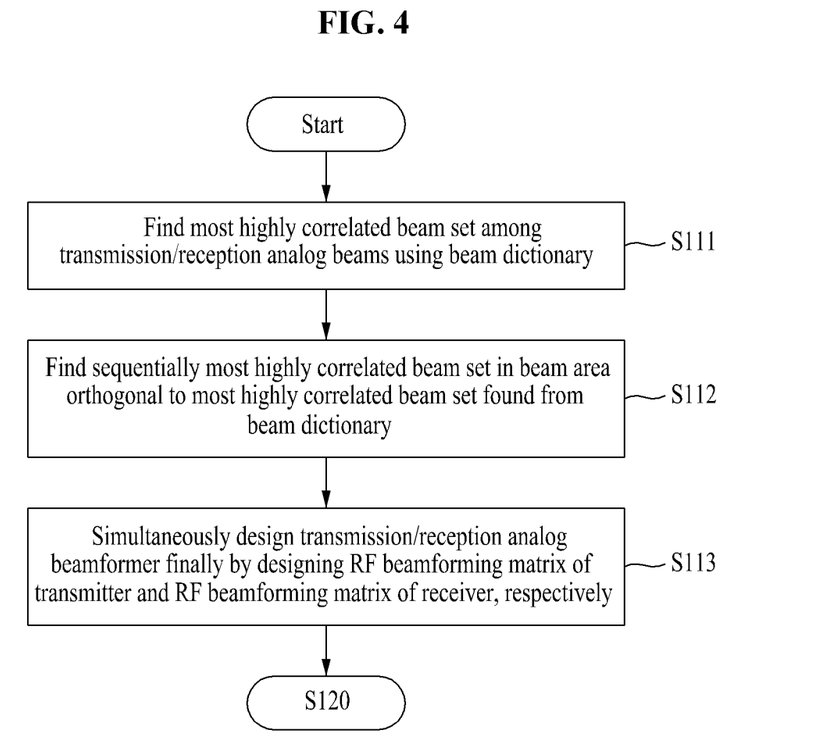
FIG. 4 is a flowchart showing a method of designing analog beamforming according to an exemplary embodiment of the present invention.

FIG. 3 is a flowchart showing a method for simultaneous design of a hybrid transceiver in an OFDM-based wideband multi-antenna system according to an exemplary embodiment of the present invention. FIG. 4 is a flowchart showing a method of designing analog beamforming according to an exemplary embodiment of the present invention.

Referring to FIG. 3, the method for simultaneous design of a hybrid transceiver in an OFDM-based wideband multi-antenna system according to an exemplary embodiment of the present invention may comprise the step S110 of designing transmission/reception analog beamforming commonly used for each subcarrier by using product information of subcarrier channel information and the step S120 of designing baseband beamforming for an effective channel of each subcarrier.

As such, the transmitter and receiver may be simultaneously designed as a hybrid structure by reflecting information of all of the subcarrier channels through two stages, in order to reduce performance degradation in spectral efficiency caused when beamforming is designed separately for the transmitter 110 and receiver 130.

The steps of the method for simultaneous design of a hybrid transceiver in an OFDM-based wideband multi-antenna system according to an exemplary embodiment of the present invention will be described below in more details.

The method for simultaneous design of a hybrid transceiver in an OFDM-based wideband multi-antenna system according to an exemplary embodiment of the present invention may be performed by the OFDM-based wideband multi-antenna system for simultaneous design of a hybrid transceiver according to an exemplary embodiment of the present invention explained with reference to FIGS. 1 and 2. Here, the OFDM-based wideband multi-antenna system for simultaneous design of a hybrid transceiver according to an exemplary embodiment of the present invention may comprise an transmission/reception analog beamformer and a baseband beamformer.

Referring to FIGS. 3 and 4, in the step S110, the transmission/reception analog beamformer may design transmission/reception analog beamforming commonly used for each subcarrier by using product information of subcarrier channel information.

More specifically, the transmission/reception analog beamformer may be designed which finds beam sets of the transmitter and receiver from a beam dictionary so as to be commonly used by the subcarrier channels, the beam sets being correlated with the product of the subcarrier channel information at a preset level or higher. The highly correlated beams may be sequentially found using the beam dictionary, in order to maximize the achievable sum rate of the transmission/reception analog beamformer commonly used for each subcarrier. For example, the transmission/reception analog beamformer may be designed in such a way that approximation is done by an achievable sum rate formula to configure the transmission/reception analog beamformer alone, as if by assuming an ideal baseband beamformer and then eliminating the baseband beamformer.

Meanwhile, as illustrated in FIG. 4, the step S110 of designing analog beamforming may comprise: the step S111 of finding the most highly correlated beam set among transmission/reception analog beams using the beam dictionary; and the step S112 of finding sequentially the most highly correlated beam set in a beam area orthogonal to the most highly correlated beam set found from the beam dictionary. The transmission/reception analog beamformer may be simultaneously designed since the highly correlated beams are sequentially found.

Moreover, the step S110 of designing analog beamforming may further comprise the step S113 of simultaneously designing the transmission/reception analog beamformer finally by designing an RF beamforming matrix of the transmitter and an RF beamforming matrix of the receiver, respectively.

Here, once the beam set most highly correlated with the product of the subcarrier channel information is found, it may fill the block of the transmission/reception analog beamformer. Also, when the most highly correlated beam set is found in a beam area orthogonal to the most highly correlated beam set found from the beam dictionary, it may fill the block of the transmission/reception analog beamformer.

In the step S120, the baseband beamformer may design baseband beamforming for an effective channel of each subcarrier.

In particular, the baseband transceiver beamformer may be designed in such a way as to maximize spectral efficiency by singular value decomposition of the effective channel information of each subcarrier. More specifically, the baseband beamforming matrix corresponding to the kth subcarrier channel of the transmitter and the baseband beamforming matrix corresponding to the kth subcarrier channel of the receiver may be designed by singular value decomposition of the effective channel information of each subcarrier.

An OFDM-based wideband multi-antenna system and a method for simultaneous design of a hybrid transceiver in the OFDM-based wideband multi-antenna system will be described below in more details.

A channel model of an OFDM-based wideband multi-antenna system (P2P OFDM multiple input/output system) for simultaneous design of a hybrid transceiver will be described below by the following formula:

[Mathmematical Expression 1]

$$H_d = \sum_{l=1}^{N_{CL}} \sum_{r=1}^{N_{ray}} \sqrt{\frac{N_t N_r}{N_{CL} N_{ray}}} \alpha_{l,r}$$

$$p_{RC}(dT_s - \tau_{l,r}) a_{RX}(\theta_{l,r}^{RX}, \phi_{l,r}^{RX})[a_{TX}(\theta_{l,r}^{TX}, \phi_{l,r}^{TX})]^H,$$

$$H[k] = \sum_{d=0}^{D-1} H_d e^{-j\frac{2\pi k}{K}a} \in \mathbb{C}^{N_{RX} \times N_{TX}}.$$

where $H_d$ represents the delay-d MIMO cluster channel with sampling time $T_s$ in the time domain, and $H[k]$ represents the channel for the kth subcarrier in the OFDM system-based frequency domain.

The notations used in this mathematical expression are as follows:

$N_{CL}$ is the number of clusters in the channel, $N_{ray}$ is the number of rays present in the channel cluster, $a_{l,r}$ is path gain, and $p_{RC}(\bullet)$ is a pulse-shaping function. Also, $\theta_{l,r}^{TX}/\phi_{l,r}^{TX}$ are the elevation/azimuth angle of each path element going out to a transmitting antenna, and $\theta_{l,r}^{RX}/\phi_{l,r}^{RX}$ are the elevation/azimuth angle of each path element coming into a receiving antenna. And, $a_{TX}(\bullet)/a_{RX}(\bullet)$ are the normalized array response vectors of transmitting/receiving array antennas, and $a_{TX}(\bullet)/a_{RX}(\bullet)$ are set according to the type of the array antennas.

After reception beamforming, a received signal at the kth subcarrier may be represented by the following formula:

$$\tilde{y}[k] = \sqrt{P_t} W_{BB}^H[k] W_{RF}^H H[k] F_{RF} F_{BB}[k] x[k] + \tilde{n} \quad [\text{Mathematic Expression 2}]$$

where $\tilde{n} \triangleq W_{BB}^H[k] W_{RF}^H n$.

When subcarrier channel information is given, hybrid beamforming design for maximizing overall spectral efficiency may be set up by the following channel capacity formula by taking an RF device constraint into account:

[Mathmematical Expression 3]

$$\underset{F_{RF}, F_{BB}[k], W_{RF}, W_{BB}[k]}{\text{argmax}} \frac{1}{K}$$

$$\sum_{k=1}^{K} \log_2 \left| I + \frac{\rho}{N_s} W_{BB}^H[k] W_{RF}^H H[k] F_{RF} F_{BB}[k] F_{BB}^H[k] F_{RF}^H H^H[k] W_{RF} W_{BB}[k] \right|$$

s.t. $[F_{RF}]_{:,n_{TX}} \in \mathcal{F}_{RF}, [W_{RF}]_{:,n_{RX}} \in \mathcal{W}_{RF}, n_{TX} = 1, \ldots ,$ $$N_{TX}, n_{RX} = 1, \ldots , N_{RX} \sum_{k=1}^{K} \|F_{RF} F_{BB}[k]\|_F^2 = K N_S$$

where $F_{RF}$, $W_{RF}$ are an implementable beam vector set provided by an RF phase shifter, which is given by $|[F_{RF}]_{n_{RF}^{TX}, n_{TX}}| = 1$, $|[W_{RF}]_{n_{RF}^{RX}, n_{RX}}| = 1$.

$(n_{RF}^{TX} = 1, \ldots, N_{RF}^{TX}, n_{RF}^{RX} = 1, \ldots, N_{RF}^{RX},$
$n_{TX} = 1, \ldots, N_{TX}, n_{RX} = 1, \ldots, N_{RX})$ A method for simultaneous design of a hybrid transceiver in an OFDM-based wideband multi-antenna system according to an exemplary embodiment of the present invention will be described below.

OFDM-based wideband hybrid beamforming is a communication system that incorporates a phase shifter network to reduce hardware complexity, which is generally configured by one physical analog beamforming block for a total number of k subcarriers.

By simultaneously designing transmission/reception analog beamforming using channel information of all subcarriers, the baseband transceiver beamformer may be designed in such a way as to minimize beamforming mismatch and maximize spectral efficiency by singular value decomposition of effective channel information of each subcarrier.

When channel information of all subcarriers is given, a problem of maximizing spectral efficiency may be set up, and the problem can be represented by the following formula by taking into account the constraint that a transceiver constitutes a hybrid beamformer.

[Mathmematical Expression 4]

$$\underset{F_{RF}, F_{BB}[k], W_{RF}, W_{BB}[k]}{\text{argmax}} \frac{1}{K}$$

$$\sum_{k=1}^{K} \log_2 \left| I + \frac{\rho}{N_s} W_{BB}^H[k] W_{RF}^H H[k] F_{RF} F_{BB}[k] F_{BB}^H[k] F_{RF}^H H^H[k] W_{RF} W_{BB}[k] \right|$$

s.t. $[F_{RF}]_{:,n_{TX}} \in \mathcal{F}_{RF}, [W_{RF}]_{:,n_{RX}} \in \mathcal{W}_{RF}, n_{TX} = 1, \ldots ,$ $$N_{TX}, n_{RX} = 1, \ldots , N_{RX} \sum_{k=1}^{K} \|F_{RF} F_{BB}[k]\|_F^2 = K N_S$$

To optimally design an analog beamformer commonly applied to subcarrier channels, a transmission/reception analog beamformer may be designed first, and then a baseband beamformer may be designed.

Specifically, the transmission/reception analog beamformer may be designed in such a way that lower bounding is applied, as if by eliminating the baseband beamformer by the Schur complement, and then the baseband beamformer may be designed by singular value decomposition for an effective channel of each subcarrier.

In the step S110, the transmission/reception analog beamformer may design transmission/reception analog beamforming commonly used for each subcarrier by using product information of subcarrier channel information.

The highly correlated beams may be sequentially found using the beam dictionary to maximize the lower bound of the transmission/reception analog beamformer commonly used for each subcarrier, which may be represented by the following formula:

[Mathmematical Expression 5]

$$\underset{F_{RF}, W_{RF}}{\text{argmax}} \frac{1}{K} \sum_{k=1}^{K} \log_2 \left| I + \frac{\rho}{N_s} W_{RF}^H H[k] F_{RF} F_{RF}^H H^H[k] W_{RF} \right|$$

s.t. $[F_{RF}]_{:,n_{TX}} \in \mathcal{F}_{RF}, [W_{RF}]_{:,n_{RX}} \in \mathcal{W}_{RF}$ If the number of multiple antennas increases, approximation can be done by the following formula in such a way that, when the lower bound formula is developed as the inner product of $\log_2(\bullet)$ by using $W_{RF}^H W_{RF} \approx I_{N_{RF}^{RX}}$, $F_{RF}^H F_{RF} \approx I_{N_{RF}^{TX}}$, $$\left( I + \frac{\rho}{N_s} H[k] F_{RF} F_{RF}^H H^H[k] \right)$$

is projected onto the analog beamformer.

[Mathmematical Expression 6]

$$\underset{F_{RF},W_{RF}}{\mathrm{argmax}}\frac{1}{K}\sum_{k=1}^{K}\log_2\left|I+\frac{\rho}{N_s}W_{RF}^H H[k]F_{RF}F_{RF}^H H^H[k]W_{RF}\right| \approx$$

$$\underset{F_{RF},W_{RF}}{\mathrm{argmax}}\frac{1}{K}\log_2\left|W_{RF}^H\prod_{k=1}^{K}\left(I+\frac{\rho}{N_s}H[k]F_{RF}F_{RF}^H H^H[k]\right)W_{RF}\right|$$

The transmission/reception analog beamformer may be simultaneously designed by finding the most highly correlated beam set using the beam dictionary among transmission/reception analog beams corresponding to $$W_{RF}^H\prod_{k=1}^{K}\left(I+\frac{\rho}{N_s}H[k]F_{RF}F_{RF}^H H^H[k]\right)W_{RF}$$

and then finding sequentially the most highly correlated beam set in a beam area orthogonal to the most highly correlated beam set, which may be represented by the following formula:

$$F_{RF} \triangleq \{\bar{f}_1, \ldots, \bar{f}_{N_{RF}^{TX}}\} = \{a_{TX}(\bar{\theta}_m^{TX}, \bar{\phi}_m^{TX}) | m = 1, \ldots, N_{RF}^{TX}\}$$

$$W_{RF} \triangleq \{\bar{w}_1, \ldots, \bar{w}_{N_{RF}^{RX}}\} = \{a_{RX}(\bar{\theta}_m^{RX}, \bar{\phi}_m^{RX}) | m = 1, \ldots, N_{RF}^{RX}\}$$

[Mathematical Expression 7]

In the step S120, the baseband beamformer may design baseband beamforming for an effective channel of each subcarrier.

As a consequence of going through the above-designed transmission/reception analog beamformer commonly used for each subcarrier, the baseband transceiver beamformer may be designed by singular value decomposition of effective channel information of each subcarrier.

Table 1 shows an algorithm for simultaneously designing an analog beamformer and a baseband beamformer.

$$\prod_{k=1}^{K}\left(\frac{N_s}{\rho}I + H[k]F_{RF}F_{RF}^H H^H[k]\right)$$

is designed using an AoA and AoD angle dictionary.

TABLE 1

Input: H, $A_{RX}$, $A_{TX}$, $N_{RF}^{TX}$, $N_{RF}^{RX}$
 $[A_{TX}]_{:,n_p^{TX}} = \alpha_{TX}(n_p^{TX}), n_p^{TX} = 1, \ldots N_P^{TX}$, $[A_{RX}]_{:,n_p^{RX}} = \alpha_{RX}(n_p^{RX}), n_p^{RX} = 1, \ldots N_P^{RX}$
 $N_P^{TX} = N_P^{RX} = N_P = N_{cl}N_{ray}$
1: $H_{res}$ = blkdiag $([U[k]]_{:,1:N_{RF}^{RX}}[\Sigma[k]]_{:,1:N_{RF}^{RX}}^{:,1:N_{RF}^{TX}}[V[k]]_{:,1:N_{RF}^{TX}}^H)$
2: $H_e[k] = H_{res}[k]$, $F_{RF} = [\ ]$, $W_{RF} = [\ ]$
3: for n = 1: min($N_{RF}^{TX}$, $N_{RF}^{RX}$)
4: $H_e^{tmp}[k] = H_e[k]A_{TX}\forall k$ 5:
$$\Psi[n_p^{TX}] = \prod_{k=1}^{K}\left(\frac{N_s}{\rho}I_{N_{RX}} + [H_e^{tmp}[k]]_{:,n_p^{TX}}\left[(H_e^{tmp}[k])_{:,n_p^{TX}}^H\right]\right) \forall n_p^{TX},$$
$\Psi[n_p^{TX}] \in \mathbb{C}^{N_{RX} \times N_{RX}}$ 6: $\tilde{\Psi}[n_p^{TX}] = A_{RX}^H\Psi[n_p^{TX}]\forall n_p^{TX}$, $\tilde{\Psi}[n_p^{TX}] \in \mathbb{C}^{N_P^{RX} \times N_{RX}}$ 7:
$$l^* = \underset{l \in \{1,2,\ldots,N_P^{RX}N_P^{TX}\}}{\mathrm{argmax}} \mathrm{diag}(\tilde{\Psi}\tilde{\Psi}^H), \mathrm{diag}(\tilde{\Psi}\tilde{\Psi}^H), \in \mathbb{C}^{N_P^{RX}N_P^{TX}},$$

8:
$$f_{RF} = a_{TX}\left(\left\lfloor\frac{l^*-1}{N_P^{RX}}\right\rfloor + 1\right) w_{RF} = a_{RX}(\mathrm{mod}\,(l^*-1, N_P^{RX})+1)$$

9: $F_{RF} = [F_{RF}, f_{RF}]$, $W_{RF} = [W_{RF}, w_{RF}]$
10: $H_e[k] = (I_{N_{Rx}} - W_{RF}(W_{RF}^H W_{RF})^{-1}W_{RF}^H) H_{res}[k] (I_{N_{TX}} - F_{RF}(F_{RF}^H F_{RF})^{-1}F_{RF}^H)\forall k$
11: end for
12: for m = min($N_{RF}^{TX}$, $N_{RF}^{RX}$) + 1 : max($N_{RF}^{TX}$, $N_{RF}^{RX}$)
13: if $N_{RF}^{TX} > N_{RF}^{RX}$
14: $H_e[k] = W_{RF}^H H[k](I_{N_{TX}} - F_{RF}(F_{RF}^H F_{RF})^{-1}F_{RF}^H)\forall k$
15: case $N_{RF}^{RX}$
16: $H_e[k] = (I_{N_{RX}} - W_{RF}(W_{RF}^H W_{RF})^{-1}W_{RF}^H)H[k]F_{RF} \forall k$
17: end
18: 4-10 repeat
19: end for
20: for k = 1: K
21: $H_{eff}[k] = W_{RF}H[k]F_{RF}$
22: compute the SVD: $H_{eff}[k] = \tilde{U}[k]\tilde{\Sigma}[k]\tilde{V}^H[k]$
23: $F_{BB}[k] = [\tilde{V}[k]]_{:,1:N_S}$, $W_{BB}[k] = [\tilde{U}[k]]_{:,1:N_S}$
24: end for Below is a more detailed description for each pseudocode block.

4: $H_e^{tmp}[k]=H_e[k]A_{TX} \in \mathbb{C}^{N_{RX} \times N_p^{TX}}$

An analog precoder is added to $H_{ee}^*[k]$ by $H_e[k]a_{TX}(x) (a_{TX}^H(x)a_{TX}(x))^{-1}a_{TX}^H(x)H_e[k]^H$, and $H_e^{tmp}=H_e(I_K \otimes A_{TX})$.

5:

$$\Psi[n_p^{TX}] = \prod_{k=1}^{K} \left(\frac{N_s}{\rho}I_{N_{RX}} + [H_e^{tmp}[k]]_{:,n_p^{TX}}\left[H_e^{tmp}[k]_{:,n_p^{TX}}^H\right]\right) \in \mathbb{C}^{N_{RX} \times N_{RX}},$$

which is the residual composed of channel information that is taken into account to find $w_{RF} \in A_{RX}$, and $\Psi=\text{blkdiag}(\Psi[1], \Psi[2], \ldots, \Psi[N_p^{TX}])$.

6: $\tilde{\Psi}[n_p^{TX}]=A_{RX}^H \Psi[n_p^{TX}] \in \mathbb{C}^{N_p^{RX} \times N_{RX}}$ $N_p^{TX}$ precoder candidate sets and $N_p^{RX}$ combiner candidate sets are formed to ultimately find $n_p^{TX}$, $n_p^{RX}$ with which the candidate sets are most highly correlated. $\tilde{\Psi}[n_p^{TX}]=\text{blk-diag}(\Psi_2[1], \Psi_2[2], \ldots, \Psi_2[N_p^{TX}])=(I_{N_p^{TX}} \otimes A_{RX}^H)\Psi$.

8:

$$l^* = \underset{l \in \{1,2,\ldots,N_p^{RX}N_p^{TX}\}}{\text{argmax}} \text{diag}(\tilde{\Psi}\tilde{\Psi}^H), \text{diag}(\tilde{\Psi}\tilde{\Psi}^H) \in \mathbb{C}^{N_p^{RX}N_p^{TX}}$$

The index l of the diagonal to $\tilde{\Psi}[n_p^{TX}] \in \mathbb{C}^{N_p^{RX} \times N_{RX}}$ represents $$f_{RF} = \alpha_{TX}\left(\left\lfloor\frac{l-1}{N_p^{RX}}\right\rfloor + 1\right), w_{RF} = a_{RX}(\text{mod}(l-1, N_p^{RX}) + 1.$$

10: $H_e[k]=(I_{N_{RX}}-W_{RF}(W_{RF}^H W_{RF})^{-1}W_{RF}^H)H_{res}[k](I_{N_{TX}}-F_{RF}(F_{RF}^H F_{RF})^{-1}F_{RF}^H)$ $H_e[k]$ is the effective channel (residual) orthogonal to $F_{RF}, W_{RF}$, and $H_e=\text{blkdiag}(H_e[1], H_e[2], \ldots, H_e[K])$.

As seen from above, according to the exemplary embodiments, an OFDM-based wideband hybrid transceiver may be simultaneously designed in two stages including: the step of designing analog beamforming common for each subcarrier using the product of subcarrier channel information; and the step of designing baseband beamforming for an effective channel of each subcarrier.

A method for simultaneous design of a hybrid transceiver in the OFDM-based wideband multi-antenna system according to the exemplary embodiments may be applied to a sub-terahertz beamforming system, which is one of the core technologies of beyond 5G mobile communication systems. Also, the exemplary embodiments may be applied to other types of communication systems using a wideband OFDM hybrid beamforming system, as well as beyond 5G mobile communication systems.

Meanwhile, the use of tremendously high frequency channels is necessary to achieve a frequency range, as in sub-terahertz communication systems, and the technological demand for sub-terahertz communication systems is expected to rise. Moreover, future mobile communication systems will have narrow coverage because of the use of tremendously high-frequency channels, which will lead to constructing highly dense small cell networks. Thus, it is expected that the technological demand for low-power, high-efficiency multi-antenna systems will rise.

The exemplary embodiments may allow for increasing spectral efficiency through accurate hybrid beamforming design to maximize the performance of all subcarriers by using instantaneous channel information. Also, the exemplary embodiments may lead the beyond 5G mobile communication technology market when applied to sub-terahertz beamforming systems.

The system described above may be realized by hardware elements, software elements and/or combinations thereof. For example, the devices and components described in the exemplary embodiments may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may process an operating system (OS) or one or more software applications running on the OS. Further, the processing unit may access, store, manipulate, process, and generate data in response to software execution. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof, and may configure a processing unit to operate in a desired manner or may independently or collectively control the processing unit. Software and/or data may be permanently or temporarily embodied in any type of machine, components, physical equipment, virtual equipment, or computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The method according to the above-described exemplary embodiments may be implemented with program instructions which may be executed through various computer means, and may be recorded in computer-readable media. The computer-readable media may also include, alone or in combination, the program instructions, data files, data structures, and the like. The program instructions recorded on the media may be those specially designed and constructed for the purposes of example embodiments, or they may be of the kind well-known and available to those having skill in the computer software arts. Examples of the computer-readable recording media may include magnetic media such as hard disks, floppy disks, and magnetic tapes, optical media such as CD-ROMs and DVDs, magneto-optical media such as floptical disks, and hardware devices specially configured to store and perform program instructions, such as ROM (ROM), random access memory (RAM), and flash memory. Examples of the program instructions may include machine-language code, such as code written by a compiler, and high-level language code executable by a computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

What is claimed is:

1. A method for simultaneous design of a hybrid transceiver in an OFDM-based wideband multi-antenna system, the method comprising:
designing transmission/reception analog beamforming commonly used for each subcarrier by using product information of subcarrier channel information;
designing baseband beamforming for an effective channel of each subcarrier; and
wherein a transceiver is simultaneously designed as a hybrid structure by reflecting information of all of the subcarrier channels through two stages, in order to reduce performance degradation in spectral efficiency caused when beamforming is designed separately for a transmitter and a receiver.

2. The method of claim 1, wherein, in the designing of baseband beamforming, a baseband transceiver beamformer is designed in such a way as to maximize spectral efficiency by singular value decomposition of the effective channel information of each subcarrier.

3. The method of claim 1, wherein, in the designing of baseband beamforming, a baseband beamforming matrix corresponding to a kth subcarrier channel of the transmitter and a baseband beamforming matrix corresponding to the kth subcarrier channel of the receiver are designed by singular value decomposition of the effective channel information of each subcarrier.

4. A method for simultaneous design of a hybrid transceiver in an OFDM-based wideband multi-antenna system, the method comprising:
designing transmission/reception analog beamforming commonly used for each subcarrier by using product information of subcarrier channel information,
wherein, in the designing of analog beamforming, a transmission/reception analog beamformer is designed which finds beam sets of the transmitter and receiver from a beam dictionary so as to be commonly used by the subcarrier channels, the beam sets being correlated with the product of the subcarrier channel information at a preset level or higher; and
designing baseband beamforming for an effective channel of each subcarrier.

5. The method of claim 4, wherein, in the designing of analog beamforming, the highly correlated beams are sequentially found using the beam dictionary, in order to maximize the achievable sum rate of the transmission/reception analog beamformer commonly used for each subcarrier.

6. The method of claim 4, wherein, in the designing of analog beamforming, the transmission/reception analog beamformer is designed in such a way that approximation is done by an achievable sum rate formula to configure the transmission/reception analog beamformer alone, as if by assuming an ideal baseband beamformer and then eliminating the baseband beamformer.

7. The method of claim 4, wherein the designing of analog beamforming comprises:

finding the most highly correlated beam set among transmission/reception analog beams using the beam dictionary; and
finding sequentially the most highly correlated beam set in a beam area orthogonal to the most highly correlated beam set found from the beam dictionary,
wherein the transmission/reception analog beamformer is simultaneously designed since the highly correlated beams are sequentially found.

8. The method of claim 7, wherein the designing of analog beamforming further comprises simultaneously designing the transmission/reception analog beamformer finally by designing an RF beamforming matrix of the transmitter and an RF beamforming matrix of the receiver, respectively.

9. The method of claim 7, wherein, in the finding of the most highly correlated beam set using the beam dictionary, once the beam set most highly correlated with the product of the subcarrier channel information is found, the beam set fills the block of the transmission/reception analog beamformer.

10. An OFDM-based wideband multi-antenna system for simultaneous design of a hybrid transceiver that reflects information of subcarrier channels through two stages, in order to reduce performance degradation in spectral efficiency caused when beamforming is designed separately for a transmitter and a receiver, the system comprising:
a transmission/reception analog beamformer that designs transmission/reception analog beamforming commonly used for each subcarrier by using product information of subcarrier channel information; and
a baseband beamformer that designs baseband beamforming for an effective channel of each subcarrier.

11. The wideband multi-antenna system of claim 10, wherein the baseband beamformer is a baseband transceiver beamformer which is designed in such a way as to maximize spectral efficiency by singular value decomposition of the effective channel information of each subcarrier.

12. The wideband multi-antenna system of claim 10, wherein the baseband beamformer designs a baseband beamforming matrix corresponding to a kth subcarrier channel of the transmitter and a baseband beamforming matrix corresponding to the kth subcarrier channel of the receiver, by singular value decomposition of the effective channel information of each subcarrier.

13. An OFDM-based wideband multi-antenna system for simultaneous design of a hybrid transceiver, the system comprising:
a transmission/reception analog beamformer that designs transmission/reception analog beamforming commonly used for each subcarrier by using product information of subcarrier channel information,
wherein the transmission/reception analog beamformer is a transmission/reception analog beamformer which finds beam sets of the transmitter and receiver from a beam dictionary so as to be commonly used by the subcarrier channels, the beam sets being correlated with the product of the subcarrier channel information at a preset level or higher; and
a baseband beamformer that designs baseband beamforming for an effective channel of each subcarrier.

14. The wideband multi-antenna system of claim 13, wherein the transmission/reception analog beamformer sequentially finds the highly correlated beams using the beam dictionary, in order to maximize the achievable sum rate of the transmission/reception analog beamformer commonly used for each subcarrier.

15. The wideband multi-antenna system of claim 13, wherein the transmission/reception analog beamformer is designed in such a way that approximation is done by an achievable sum rate formula to configure the transmission/reception analog beamformer alone, as if by assuming an ideal baseband beamformer and then eliminating the baseband beamformer.

16. The wideband multi-antenna system of claim 13, wherein the transmission/reception analog beamformer simultaneously designs transmission/reception analog beamforming by finding the most highly correlated beam set among transmission/reception analog beams using the beam dictionary and finding sequentially the most highly correlated beam set in a beam area orthogonal to the most highly correlated beam set found from the beam dictionary.

17. The wideband multi-antenna system of claim 16, wherein the transmission/reception analog beamformer simultaneously designs the transmission/reception analog beamformer finally by designing an RF beamforming matrix of the transmitter and an RF beamforming matrix of the receiver, respectively.

18. The wideband multi-antenna system of claim 16, wherein once the transmission/reception analog beamformer finds the beam set most highly correlated with the product of the subcarrier channel information, the beam set fills the block of the transmission/reception analog beamformer.

\* \* \* \* \*